United States Patent
Mano (12) United States Patent (10) Patent No.: US 11,209,356 B2
Mano (45) Date of Patent: Dec. 28, 2021

(54) GAS ABSORPTION SPECTROMETER AND GAS ABSORPTION SPECTROSCOPY METHOD

(71) Applicant: SHIMADZU CORPORATION, Kyoto (JP)

(72) Inventor: Kazune Mano, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 73 days.

(21) Appl. No.: 16/656,045

(22) Filed: Oct. 17, 2019

(65) Prior Publication Data

US 2020/0240910 A1 Jul. 30, 2020

(30) Foreign Application Priority Data

Sep. 3, 2018 (JP) .............................. JP2018-164743

(51) Int. Cl.
 *G01N 21/39* (2006.01)
 *G01N 21/3504* (2014.01)
 *G01J 3/433* (2006.01)
(52) U.S. Cl.
 CPC ............ *G01N 21/39* (2013.01); *G01J 3/4338* (2013.01); *G01N 21/3504* (2013.01); *G01N 2021/399* (2013.01)
(58) Field of Classification Search
 CPC ............... G01N 21/39; G01N 21/3504; G01N 2021/399; G01J 3/4338; G01J 3/433
 See application file for complete search history.

(56) References Cited

U.S. PATENT DOCUMENTS

| 8,152,900 B2 * | 4/2012 | Zhou ................. G01N 21/3504 95/90 |
| 9,267,880 B1 * | 2/2016 | Tan ......................... G01J 3/427 |
| 2009/0164138 A1 * | 6/2009 | Goto ................. G01N 21/3504 702/24 |

(Continued)

*Primary Examiner* — Sang H Nguyen
(74) *Attorney, Agent, or Firm* — Sughrue Mion, PLLC (57) ABSTRACT

A gas absorption spectrometer is provided that is capable of measuring a gas concentration and the like with high accuracy even when a measurement target gas is mixed with a gas other than the measurement target gas. A gas absorption spectrometer includes: a wavelength tunable light source; a light source control unit to change a wavelength of the light source; a gas cell to have a measurement object gas introduced thereto, the measurement object gas containing a measurement target gas and a mixed gas other than the measurement target gas; a photodetector to detect intensity of light having passed through the gas cell; a spectrum preparation unit to prepare an absorption spectrum of the measurement object gas from a change in the light intensity relative to the change in the wavelength; a physical quantity measurement unit to measure at least one of a temperature and a concentration of the measurement target gas based on an absorption spectrum of the measurement target gas; a gas concentration measurement unit to measure a concentration of the mixed gas; and a physical quantity correction unit to correct at least one of the temperature and the concentration of the measurement target gas measured by the physical quantity measurement unit based on the concentration of the mixed gas.

20 Claims, 7 Drawing Sheets

(56) References Cited

U.S. PATENT DOCUMENTS

| | | | | |
|---|---|---|---|---|
| 2013/0133647 A1* | 5/2013 | Ratajczak | ............... | A62B 7/14 |
| | | | | 128/202.22 |
| 2015/0338342 A1* | 11/2015 | Muramatsu | ............... | G01J 3/10 |
| | | | | 356/409 |
| 2016/0331270 A1* | 11/2016 | Yumoto | ............... | A61B 5/7278 |
| 2017/0003218 A1* | 1/2017 | Sharma | ............... | G01N 21/274 |
| 2019/0011354 A1* | 1/2019 | Poehler | ................. | G01N 21/31 |

\* cited by examiner

GAS ABSORPTION SPECTROMETER AND GAS ABSORPTION SPECTROSCOPY METHOD

BACKGROUND OF THE INVENTION

1. Field of the Invention

The present invention relates to a gas absorption spectrometer and a gas absorption spectroscopy method to measure the concentration, the temperature, and the like of a measurement target gas based on the laser light absorption spectrum of the gas. The gas absorption spectrometer and the gas absorption spectroscopy method are applicable to, for example, non-contact rapid measurement of a gas concentration and a gas temperature in the automotive industry and also to a wide variety of fields, such as measuring a gas in a high-temperature high-pressure environment like a combustion gas in a plant furnace.

2. Description of the Related Art

Wavelength modulated spectroscopy (WMS) is conventionally known as gas absorption spectroscopy to measure laser light with a photodetector by irradiating a measurement target gas with laser light. In WMS, while a wavelength of laser light is swept, the wavelength is sinusoidally modulated in a period sufficiently shorter than the sweep period (i.e., at a sufficiently high frequency f). Then, it is disclosed that detection of a harmonic at a frequency f (generally, second harmonic, 2f) by the photodetector allows measurement of gas absorption with high sensitivity (JP 2011-196832 A, Reid, J. and Labrie, D.; "Second-harmonic detection with tunable diode lasers-comparison of experiment and theory," Appl. Phys. B 26, 203-210 (1981); J. A. Silver, "Frequency-modulation spectroscopy for trace species detection: theory and comparison among experimental methods," Appl. Opt. 31 (1992), 707-717; and G. B. Rieker, J. B. Jeffries, and R. K. Hanson, "Calibration-free wavelength modulation spectroscopy for measurements of gas temperature and concentration in harsh environments," Appl. Opt., submitted 2009). While a lock-in amplifier is generally used for detection of a harmonic, a method is also proposed in which a detector signal is directly subjected to digital sampling for FFT analysis, thereby performing synchronous detection at 2f (T. Fernholz, H. Teichert, and V. Ebert, "Digital, phase-sensitive detection for in situ diode-laser spectroscopy under rapidly changing transmission conditions," Appl. Phys. B 75, 229-236 (2002)).

As just described, conventional WMS has good sensitivity and robustness (ease of measurement) and is thus considered preferred for application to industrial gas absorption spectrometers, whereas it has a problem of a decrease in measurement accuracy of a gas concentration, a gas temperature, and the like in rapid measurement because it is difficult to increase the wavelength modulation frequency of the laser and it is also difficult to accurately measure the wavelength modulation width at high wavelength modulation frequencies.

To solve such problems, a method is proposed in which an absorption spectrum of a measurement target gas is obtained from a change in light intensity relative to a change in a wavelength of the laser, the absorption spectrum is approximated by an approximate polynomial, and an nth order differential spectrum of the absorption spectrum is formed based on the factor in each term of the approximate polynomial to measure the temperature, the concentration, the pressure, and the like of the measurement target gas based on the nth order differential spectrum (Japanese Patent No. 5983779).

The gas absorption spectrometer and the gas absorption spectroscopy method described in Japanese Patent No. 5983779 allows measurement of the gas concentration, the gas temperature, and the like with high accuracy even in rapid measurement. However, the measurement target gas is often mixed with other gases depending on the measurement environment and such a case presents a problem that the absorption spectrum thus obtained itself is altered and it is not possible to accurately measure (i.e., it causes a measurement error in) the gas concentration, the gas temperature, and the like of the measurement target gas.

SUMMARY

The present invention has been made in view of such circumstances, and it is an object thereof to provide a gas absorption spectrometer and a gas absorption spectroscopy method that are capable of measuring a gas concentration and the like with high accuracy even when a measurement target gas is mixed with other gases.

To achieve the above problems, a gas absorption spectrometer of the present invention includes: a wavelength tunable light source; a light source control unit configured to change a wavelength of light emitted from the light source; a gas cell configured to have a measurement object gas introduced thereto, the measurement object gas containing a measurement target gas and a mixed gas other than the measurement target gas; a photodetector configured to detect intensity of light emitted from the light source and having passed through the gas cell; a spectrum preparation unit configured to prepare an absorption spectrum of the measurement object gas from a change in the light intensity relative to the change in the wavelength by the light source control unit; a physical quantity measurement unit configured to measure at least one of a temperature and a concentration of the measurement target gas based on an absorption spectrum of the measurement target gas; a gas concentration measurement unit configured to measure a concentration of the mixed gas; and a physical quantity correction unit configured to correct at least one of the temperature and the concentration of the measurement target gas measured by the physical quantity measurement unit based on the concentration of the mixed gas.

The "wavelength" herein uniquely corresponds to a "wave number" and it is also possible to establish a similar configuration using the "wave number".

The "mixed gas" herein means a gas other than the measurement target gas in a measurement system and is a concept including multiple types of gases.

The gas absorption spectrometer may be configured that the physical quantity measurement unit includes: a polynomial approximation unit configured to approximate the absorption spectrum by an approximate polynomial in a wavelength width range equivalent to a wavelength modulation width of WMS at each point of the wavelength; and a differential spectrum preparation unit configured to prepare a second order differential spectrum of the absorption spectrum based on a factor in each term of the approximate polynomial at each point, and at least one of the temperature and the concentration of the measurement target gas is measured based on the second order differential spectrum of the measurement target gas. In this case, the gas concentration measurement unit may measure the concentration of the mixed gas based on a second order differential spectrum of the mixed gas.

The gas concentration measurement unit may be disposed in the gas cell and have a concentration sensor configured to measure the concentration of the mixed gas.

The physical quantity correction unit may have an approximate expression representing a change in peak height of the second order differential spectrum of the measurement target gas relative to the concentration of the mixed gas and may be configured to correct at least one of the temperature and the concentration of the measurement target gas measured by the physical quantity measurement unit using a correction value obtained by the approximate expression. In this case, the approximate expression is a power function.

The physical quantity correction unit desirably has a correction value representing relationship between the concentration of the mixed gas and a peak height of the second order differential spectrum of the measurement target gas and is desirably configured to correct at least one of the temperature and the concentration of the measurement target gas measured by the physical quantity measurement unit using the correction value. In this case, the correction value may be determined based on a change in Lorentz broadening coefficient (Air) relative to the concentration of the mixed gas.

The physical quantity correction unit may be configured to have a database to store the correction value therein.

The physical quantity measurement unit may measure at least one of the temperature and the concentration of the measurement target gas using a peak height of the second order differential spectrum.

The gas absorption spectrometer may include a pressure sensor configured to detect a pressure of the measurement object gas, wherein the physical quantity correction unit corrects at least one of the temperature and the concentration of the measurement target gas measured by the physical quantity measurement unit based on the pressure of the measurement object gas and the concentration of the mixed gas.

The approximate polynomial may be an approximate quadratic polynomial.

The gas absorption spectrometer may be a cavity ring-down absorption spectrometer.

From another aspect, a gas absorption spectroscopy method of the present invention includes: irradiating a measurement object gas containing a measurement target gas and a mixed gas other than the measurement target gas with light with a tunable wavelength; detecting intensity of light having passed through the measurement object gas; preparing an absorption spectrum of the measurement object gas from a change in the light intensity relative to a change in the wavelength; measuring at least one of a temperature and a concentration of the measurement target gas based on an absorption spectrum of the measurement target gas; measuring a concentration of the mixed gas; and correcting at least one of the temperature and the concentration of the measurement target gas based on the concentration of the mixed gas.

As described above, the gas absorption spectrometer and the gas absorption spectroscopy method of the present invention are capable of measuring gas concentration and temperature with high accuracy even when a measurement target gas is mixed with other gases because at least one of the temperature and the concentration of the measurement target gas measured by the physical quantity measurement unit based on the concentration of the mixed gas.

DETAILED DESCRIPTION OF THE PREFERRED EMBODIMENTS

A detailed description is given below to embodiments of the present invention with reference to the drawings. In the drawings, an identical sign is given to identical or equivalent parts not to repeat the description.

Configuration of Gas Absorption Spectrometer

Figure 1:
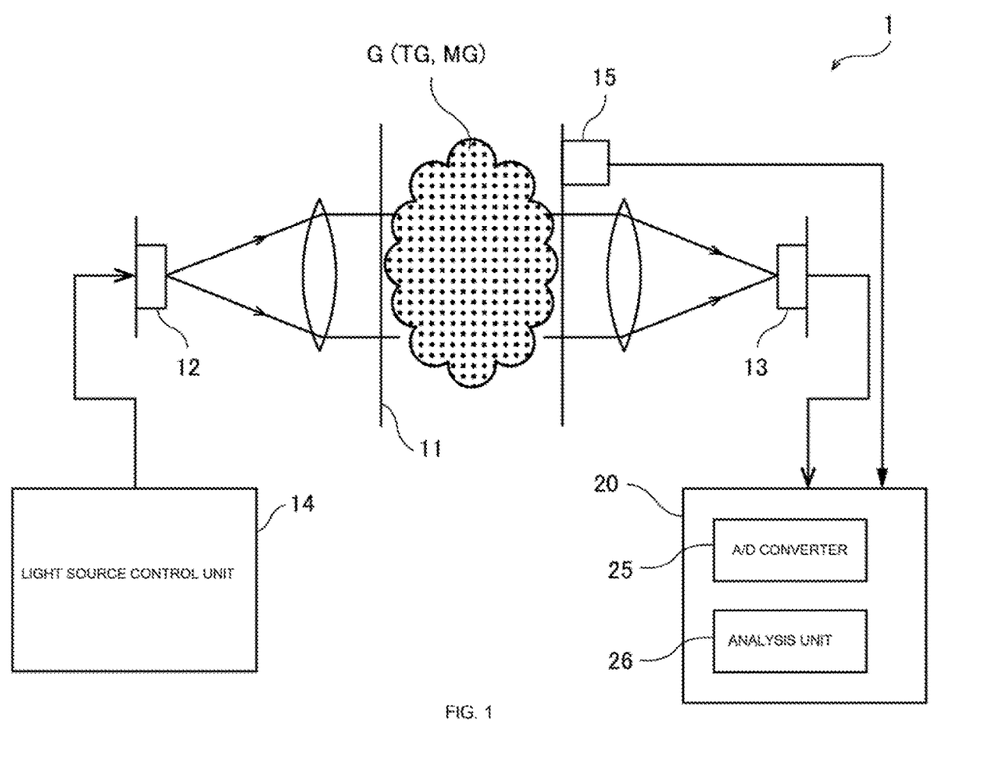
FIG. 1 is a diagram illustrating a schematic configuration of a gas absorption spectrometer according to an embodiment of the present invention.

FIG. 1 is a diagram illustrating a schematic configuration of a gas absorption spectrometer according to an embodiment of the present invention. As illustrated in FIG. 1, a gas absorption spectrometer 1 in the present embodiment includes: a gas cell 11 to have a measurement object gas G introduced thereto, the measurement object gas G containing a measurement target gas TG and a mixed gas MG other than the measurement target gas TG; a laser light source 12 disposed on one side across the gas cell 11; a photodetector 13 disposed on the other side; a light source control unit 14 to control the laser light source 12; a pressure sensor 15 to detect a pressure of the measurement object gas G in the gas cell 11; and a measurement unit 20 connected to the photodetector 13 and the pressure sensor 15 to quantify output of the photodetector 13 and the pressure sensor 15 for storage and to perform various calculations.

The gas cell 11 is a component made of, for example, glass or a resin that is disposed between the laser light source 12 and the photodetector 13 and configured to transmit light from the laser light source 12.

The laser light source 12 is wavelength tunable in a range covering absorption wavelengths of at least the measurement target gas TG and the mixed gas MG and is configured with, for example, quantum cascade laser (QCL) or injection current controlled wavelength-tunable diode laser.

The light source control unit 14 is a device that controls the laser light source 12 to sweep (change) the wavelength of the laser light source 12 between predetermined minimum and maximum wavelengths.

The photodetector 13 is a device that detects the intensity of light emitted from the laser light source 12 and having passed through the gas cell 11 and is configured with, for example, a photodiode with spectroscopic sensitivity in a wavelength tunable range of the laser light source 12. The photodetector 13 is connected to the measurement unit 20, and information (electrical signal) on the light intensity detected by the photodetector 13 is output to the measurement unit 20.

The pressure sensor 15 is a sensor that that has a sensor surface, not shown, exposed in the gas cell 11 to detect the pressure of the measurement object gas G. The pressure sensor 15 is connected to the measurement unit 20, and information (electrical signal) on the pressure detected by the pressure sensor 15 is output to the measurement unit 20.

The measurement unit 20 has an A/D converter 25 and an analysis unit 26. The A/D converter 25 is a device that digitizes the information on the light intensity output from the photodetector 13 and the information on the pressure output from the pressure sensor 15 for storage in in a storage device, not shown. The analysis unit 26 is a device that mathematically calculates data obtained by the A/D converter 25 (data in the storage device) to measure the temperature and the concentration of the measurement target gas TG (described later in detail).

Figure 2:
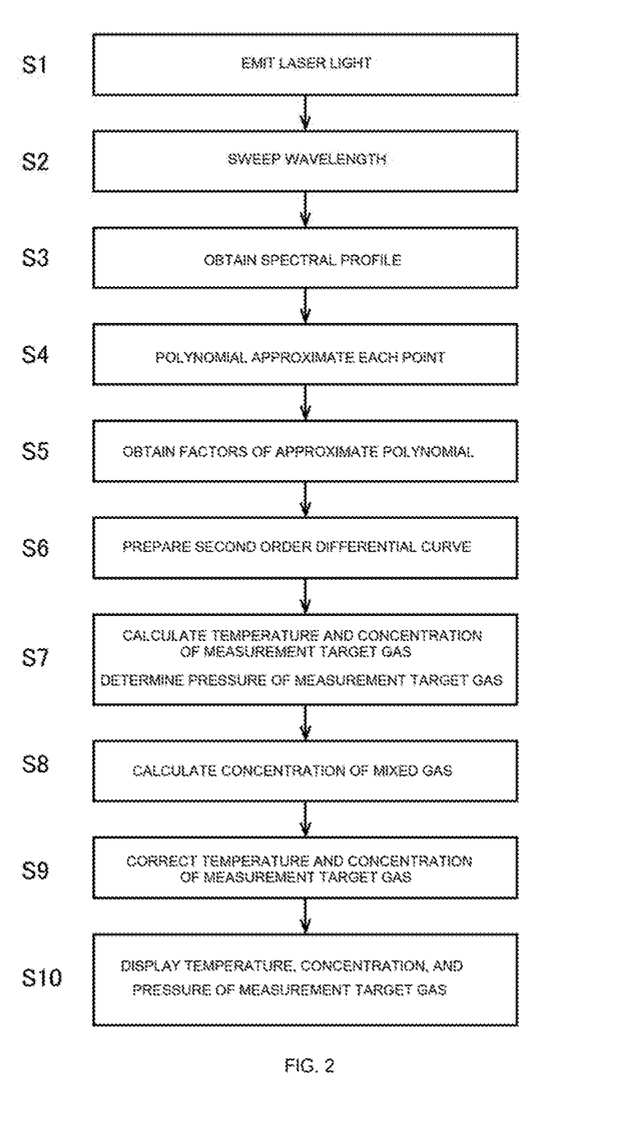
FIG. 2 is a flow chart illustrating a procedure for measuring a temperature and a concentration of a measurement target gas using the gas absorption spectrometer according to the above embodiment of the present invention.

Procedure for Measuring Temperature and Concentration of Measurement Target Gas TG FIG. 2 is a flow chart illustrating a procedure for measuring the temperature and the concentration of the measurement target gas TG using the gas absorption spectrometer 1 according to the present embodiment. As illustrated in FIG. 2, in the measurement procedure of the present embodiment, first, the light source control unit 14 controls the laser light source 12 to emit laser light at a predetermined minimum wavelength (step S1), and the wavelength is sequentially changed to be swept to the maximum wavelength (step S2). Since passing through the measurement object gas G in the gas cell 11, the light from the laser light source 12 is subjected to absorption at wavelengths in accordance with the measurement object gas G (i.e., measurement target gas TG and mixed gas MG) at this point. Then, the laser light having passed through the measurement object gas G is subjected to detection of the intensity by the photodetector 13. Subsequently, the information on the light intensity output from the photodetector 13 and the information on the pressure output from the pressure sensor 15 are digitized by the A/D converter 25 and sent to the analysis unit 26 to be stored in the storage device, not shown. Then, the analysis unit 26 obtains the spectral profile of the measurement object gas G based on the change in the light intensity information (step S3 (spectrum preparation unit)).

Figure 3:
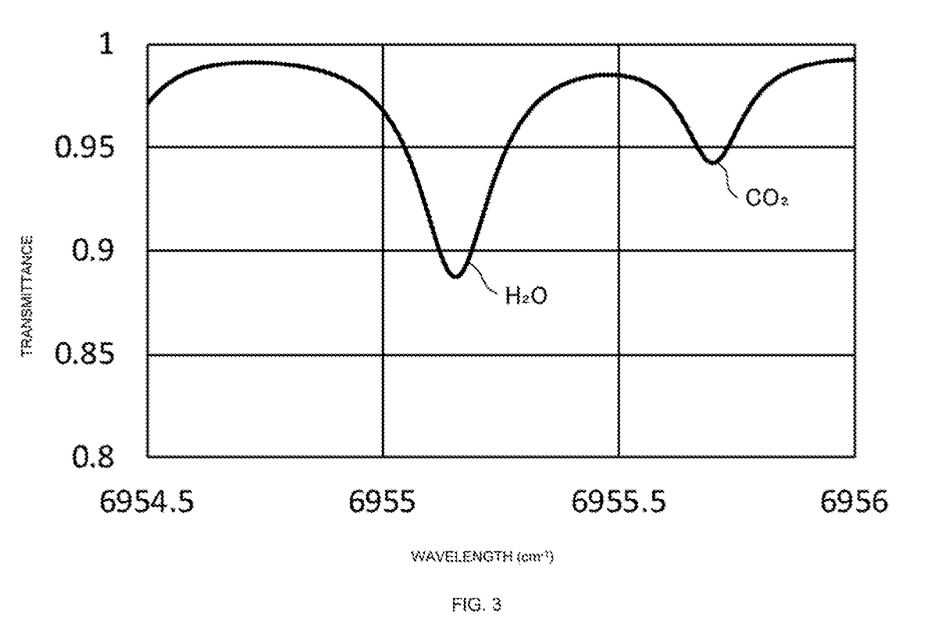
FIG. 3 is a diagram illustrating an example of a spectral profile obtained by the gas absorption spectrometer according to the above embodiment of the present invention.

FIG. 3 is a diagram illustrating an example of the spectral profile obtained at step S3, where the measurement target gas TG is assumed to be $H_2O$ and the mixed gas MG to be $CO_2$. While the profile in FIG. 3 is simulated from a spectral profile of $H_2O$ and $CO_2$ obtained from the HITRAN 2008 database for an $H_2O$ concentration of 1(%), a $CO_2$ concentration of 10(%), a temperature of 300 (K), and a pressure of 1 (atm), the spectral profile obtained in steps S1-S3 is actually used. As illustrated in FIG. 3, in the present embodiment, the measurement target gas TG ($H_2O$) and the mixed gas MG ($CO_2$) are introduced into the gas cell 11, and thus in the spectral profile obtained at step S3, an absorption peak of the measurement target gas TG ($H_2O$) appears around a wave number of 6955.2 ($cm^{-1}$) and an absorption peak of the mixed gas MG ($CO_2$) appears around a wave number of 6955.7 ($cm^{-1}$).

In the analysis unit 26, based on the data of the spectral profile, mathematical calculation described later is further performed. More specifically, the spectral profile obtained at step S3 is subjected to calculation using an approximate polynomial for rapid and simple processing equivalent to second order detection of WMS to measure various physical quantities of the measurement target gas TG.

In this context, in the present embodiment, a range [$\underline{v}-a'<v \leq \underline{v}+a'$] of a width $2a'$ about the center of each point $\underline{v}$ on a wave number axis in the spectral profile obtained at step S3 is considered to be represented by an approximate polynomial:

[Math 1]

$$\tau(v) = b_0 + b_1(v-\bar{v}) + b_2(v-\bar{v})^2 + b_3(v-\bar{v})^3 + \ldots \quad (1).$$

The characters "$v$" and "$\underline{v}$" denote wave numbers, "$\tau$" denote a profile of a transmission spectrum, and "$a'$" denotes a modulation amplitude. Since an overline is not available due to the limitation of the electronic filing, underlined expression such as "$\underline{v}$" is used while "$\bar{v}$" means the overlined "$v$" in the expression (1). Then, an nth order differential of the expression (1) is obtained as

[Math 2]

$$\left. \frac{d^n \tau(v)}{dv^n} \right|_{v=\bar{v}} = b_n. \quad (2)$$

Here, generally, the spectral profile of an nth order harmonic obtained by synchronous detection in WMS is approximately represented by the following expression (Equation 8 in Reid, J. and Labrie, D.; "Second-harmonic detection with tunable diode lasers-comparison of experiment and theory," Appl. Phys. B 26, 203-210 (1981)):

[Math 3]

$$H_n(\bar{v}) \approx \frac{2^{1-n}\tau(v)}{n!} a^n \left. \frac{d^n \tau(v)}{dv^n} \right|_{v=\bar{v}}, n \geq 1, \quad (3)$$

and from the expressions (2) and (3),

[Math 4]

$$H_n(\bar{v}) \approx \frac{2^{1-n}}{n!} a^n b_n, n \geq 1 \quad (4)$$

is obtained. Then, it is known that, to calculate a WMS signal to the wave number v in the spectrum obtained at step S3, the wave number range [$\underline{v}-a'<v \leq \underline{v}+a'$] is fit by the least squares method or the like (i.e., polynomial approximated) and the factors b0, b1, b2, b3, . . . are obtained (i.e., the factors of the approximate polynomial are obtained), and further v is sequentially changed to prepare the profiles of the factors b1 and b2 obtained by fitting, which are equivalent to WMS profiles of 1f and 2f (Japanese Patent No. 5983779).

Figure 4:
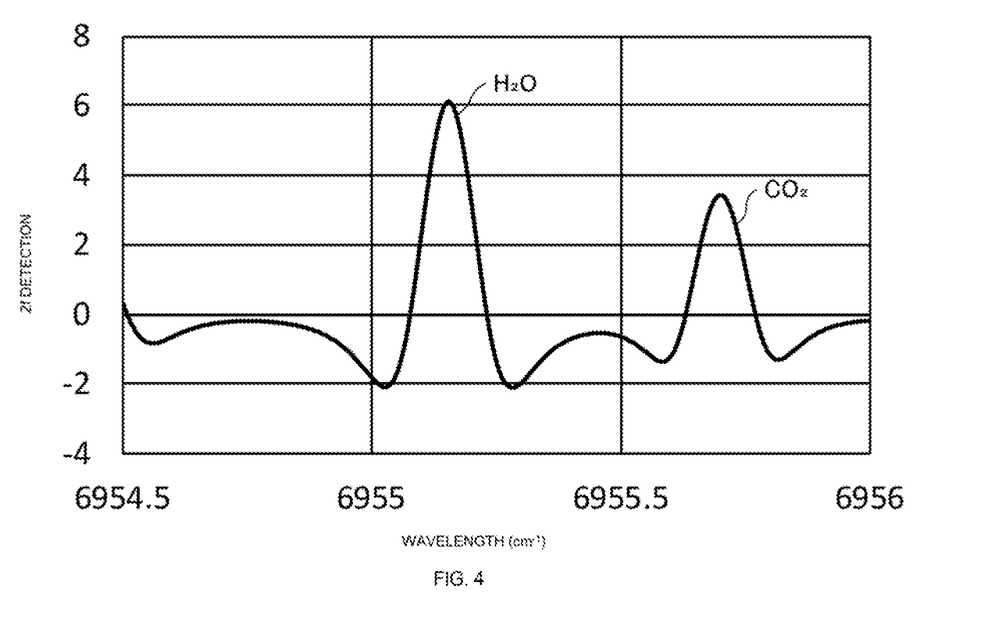
FIG. 4 is a diagram illustrating an example of a second order differential curve (second order differential spectrum) obtained by the gas absorption spectrometer according to the above embodiment of the present invention.

In the present embodiment, by polynomial approximating in the spectrum obtained at step S3 (step S4 (polynomial approximation unit)), obtaining factors of the approximate polynomial (step S5), and preparing the profile of the factor b2, a second order differential curve (second order differential spectrum) is prepared (step S6 (differential spectrum preparation unit)). FIG. 4 is a diagram illustrating an example of the second order differential curve (second order differential spectrum) prepared by the method in the present embodiment.

Then, in the measurement procedure of the present embodiment, based on the second order differential curve obtained at step S6, the temperature and the concentration of the measurement target gas TG are calculated (step S7 (physical quantity measurement unit)). Specifically, since correlation between the peak height of the second order differential curve obtained at step S6 and the concentration of the measurement target gas TG is known (Japanese Patent No. 5983779), the concentration of the measurement target gas TG is measured by measuring the peak height of the second order differential curve. Since it is also known that a ratio of the magnitude of two absorption peaks of the second order differential curve changes with a change in the temperature of the measurement target gas TG (Japanese Patent No. 5983779), the temperature of the measurement target gas TG is measured by measuring the ratio of the magnitude of the two absorption peaks of the second order differential curve. The information on the pressure detected by the pressure sensor 15 is stored as the pressure of the measurement target gas TG.

As just described, the absorption spectrum of the measurement target gas TG is obtained from the change in the light intensity relative to the change in the wavelength of the laser light source 12, the absorption spectrum is approximated by the approximate polynomial, and a second order differential spectrum of the absorption spectrum is prepared based on the factor in each term of the approximate polynomial, thereby allowing calculation of the temperature and the concentration of the measurement target gas TG from the second order differential spectrum. However, as a result of keen examinations by the present inventor, it is found that the peak height of the spectral profile obtained at step S3 varies when the measurement object gas G contains the mixed gas MG other than the measurement target gas TG as in the present embodiment.

Figure 5A:
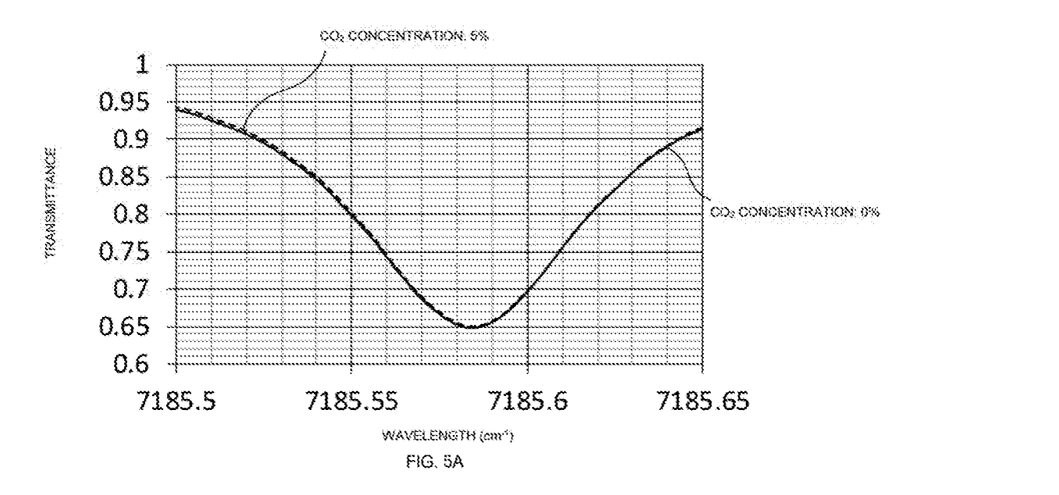
FIGS. 5A-5C are diagrams illustrating examples of a spectral profile of a measurement target gas ($H_2O$) obtained by the gas absorption spectrometer according to the above embodiment of the present invention.
Figure 5B:
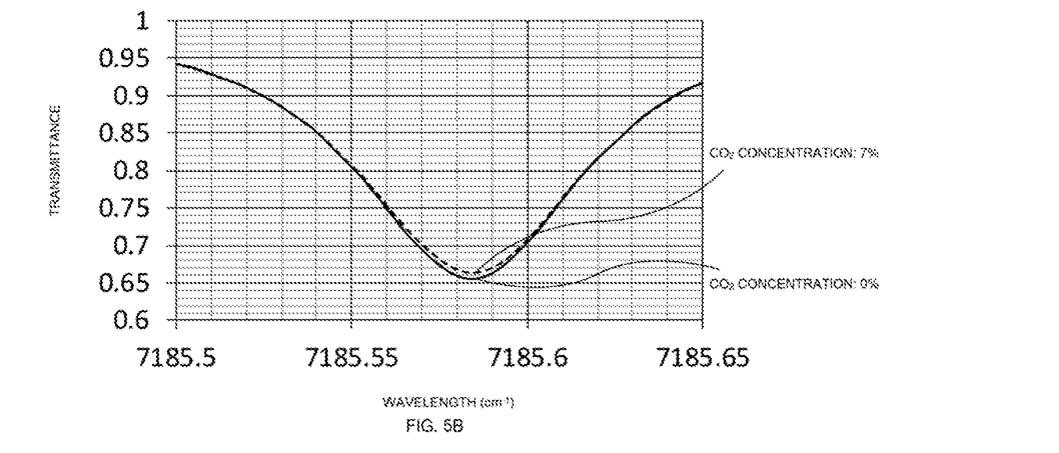
Figure 5C:
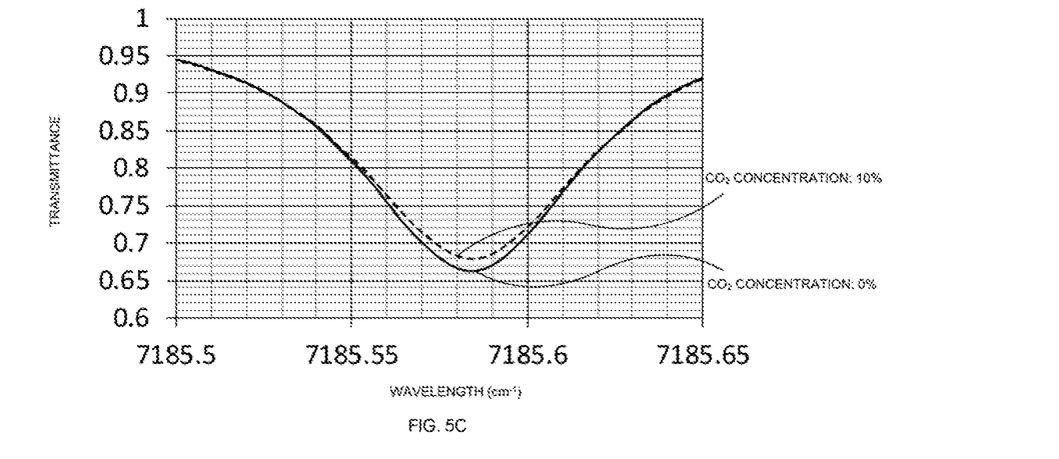

FIGS. 5A-5C are spectral profiles of the measurement target gas TG ($H_2O$) where the measurement target gas TG is assumed to be $H_2O$ and the mixed gas MG to be $CO_2$. FIG. 5A is a profile for a mixed gas MG ($CO_2$) concentration of 5%, FIG. 5B is a profile for a mixed gas MG ($CO_2$) concentration of 7%, and FIG. 5C is a profile for a mixed gas MG ($CO_2$) concentration of 10%. As seen from comparison of FIGS. 5A-5C, it is understood that the higher the concentration of the mixed gas MG, the less the absorption of the measurement target gas TG ($H_2O$).

As just described, when the peak height of the spectral profile obtained at step S3 varies, the peak height of the second order differential spectrum obtained at step S6 also varies, thereby not allowing accurate calculation of the temperature and the concentration of the measurement target gas TG from the second order differential spectrum obtained at step S6. To solve such a problem, in the present embodiment, the concentration of the mixed gas MG is calculated based on the second order differential curve obtained at step S6 (step S8 (gas concentration measurement unit)), thereby correcting the temperature and the concentration of the measurement target gas TG obtained at step S7 (step S9 (physical quantity correction unit)).

Figure 6:
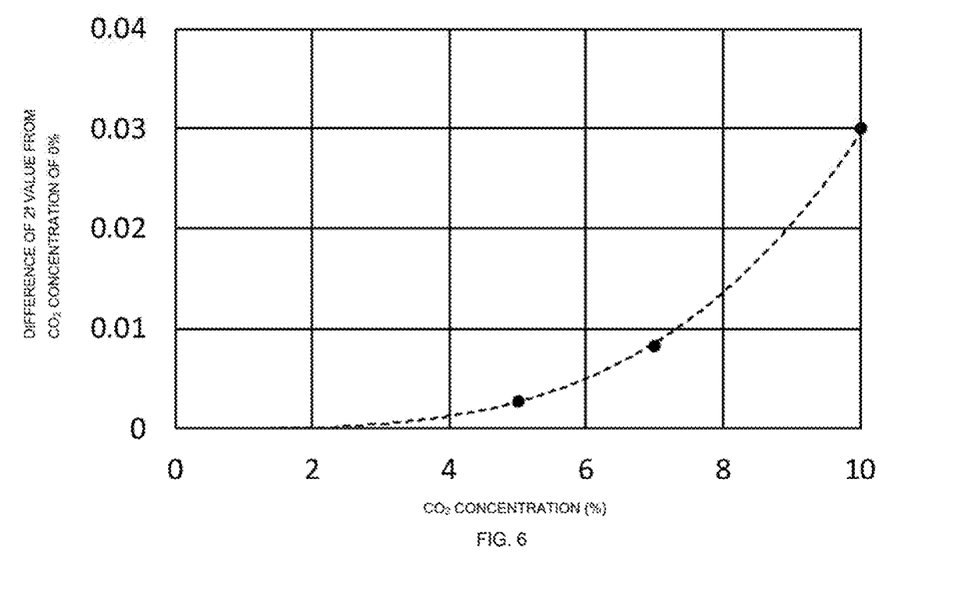
FIG. 6 is a graph illustrating relationship between a concentration of a mixed gas ($CO_2$) and an amount of correction (amount of change in peak height of the second order differential spectrum) of the measurement target gas ($H_2O$).

Specifically, at step S8, the absorption peak of the mixed gas MG ($CO_2$) is detected (i.e., the peak at a wave number of approximately 6955.7 ($cm^{-1}$) is detected) from the second order differential curve obtained at step S6 and the peak height is measured to calculate the concentration of the mixed gas MG. Then, an amount of correction of the concentration and the temperature of the measurement target gas TG is calculated from the calculated concentration of the mixed gas MG, and the amount of correction is added or multiplied to the temperature and the concentration of the measurement target gas TG obtained at step S7 to correct the temperature and the concentration of the measurement target gas TG (step S9). FIG. 6 is a graph illustrating relationship between the concentration of the mixed gas MG ($CO_2$) and the amount of correction (amount of change in the peak height of the second order differential spectrum) of the measurement target gas TG ($H_2O$). As illustrated in FIG. 6, the amount of correction of the measurement target gas TG ($H_2O$) (amount of change in the peak height of the second order differential spectrum) may be generally expressed by a power function. Accordingly, in the present embodiment, using an approximate expression of the characteristic curve illustrated in FIG. 6, the amount of correction of the measurement target gas TG ($H_2O$) is obtained from the concentration of the mixed gas MG calculated by step S8.

The temperature and the concentration of the measurement target gas TG corrected at step S9 are displayed on a display device, not shown, together with the pressure data stored at step S7.

As just described, the gas absorption spectrometer 1 according to the present embodiment approximates the absorption spectrum of the measurement target gas TG by the approximate polynomial, prepares a second order differential spectrum of the absorption spectrum based on the factor in each term of the approximate polynomial, and calculates the temperature and the concentration of the measurement target gas TG based on the second order differential spectrum. Accordingly, it is possible to rapidly and simply measure various physical quantities of the measurement target gas. Even when the measurement target gas TG is mixed with the mixed gas MG, the concentration and the temperature of the measurement target gas TG are corrected from the concentration of the mixed gas MG to allow measurement with high accuracy.

While the above embodiment of the present invention has been described, the present invention is not limited to the configuration, the specific numerical configuration, and the like in the present embodiment and is allowed to be variously modified within the scope of the technical idea of the present invention.

For example, while the description is made in the present embodiment assuming that the measurement target gas TG is $H_2O$ and the mixed gas MG is $CO_2$, the present invention is not limited to such a configuration and is applicable to various measurement target gases TG and mixed gases MG. Moreover, the mixed gas MG is not limited to one type of gas, and the present invention is also applicable to a case of containing a plurality of mixed gases MG.

While the gas absorption spectrometer 1 according to the present embodiment is described that it calculates the temperature and the concentration of the measurement target gas TG, the gas absorption spectrometer 1 is not limited to such a configuration and may be configured to measure at least one of the temperature and the concentration of the measurement target gas TG.

While the gas absorption spectrometer 1 according to the present embodiment is described that it corrects the temperature and the concentration of the measurement target gas TG based on the concentration of the mixed gas MG, it may correct the temperature and the concentration of the measurement target gas TG based on the concentration and the pressure of the mixed gas MG.

While the description at step S8 in the present embodiment is made that the concentration of the mixed gas MG is described to be calculated from the second order differential curve obtained at step S6, the present invention may be configured to, for example, dispose a concentration sensor in the gas cell 11 to measure the concentration of the mixed gas MG using the concentration sensor.

While the amount of correction of the measurement target gas TG is obtained using the approximate expression representing the relationship between the concentration of the mixed gas MG and the amount of correction of the measurement target gas TG at step S9 in the present embodiment, the present invention is not limited to such a configuration and a correction value may be obtained from a database (by a so-called look up table (LUT)) that is prepared to obtain the correction value from, for example, relationship between the concentration of the mixed gas MG and the peak height of the second order differential spectrum of the measurement target gas TG.

For preparation of the database, it is also possible to prepare the correction value from numerical calculation. In theoretical expressions (5) and (6) of the absorption spectrum:

[Math 5]

$$T_{\gamma L} = 1.0384 \times 10^{16} \left(\frac{296}{T}\right)\left(\frac{S(T) \times l \times p \times c}{\gamma_L}\right) \frac{1}{1 + [(v - v_c)/\gamma_L]^2}; \quad (5)$$

[Math 6]

$$\gamma_L = [\gamma_{air}(1 - c) + \gamma_{self}(c)]\left(\frac{p}{760}\right)\left(\frac{296}{T}\right)^n, \quad (6)$$

a change in the concentration of the mixed gas MG means a change in the Lorentz broadening coefficient (Air) of $\gamma_{air}$, thereby allowing calculation of a 2f value at the absorption peak wavelength to the concentration of each mixed gas MG by calculating a correction factor a that varies with the concentration of the mixed gas MG from the actually measured spectrum to substitute $a \cdot \gamma_{air}$ for $\gamma_{air}$ in the expressions (5) and (6). As just described, the correction value may be obtained by simple numerical calculation to be used for creation of the database. In the expressions (5) and (6), "$T_{\gamma L}$" denotes absorbance, "T" denotes a temperature (K), "S(T)" denotes line intensity (cm$^{-1}$/(molecule·cm$^2$)), "l" denotes an optical path length (cm), "p" denotes a pressure (atm), "c" denotes a concentration, "$\gamma_L$" denotes a Lorentz broadening coefficient (cm$^{-1}$/atm), "v" denotes a wave number (cm$^{-1}$), "$v_c$" denotes a central wave number "$\gamma_{air}$" denotes a Lorentz broadening coefficient (Air) (cm$^{-1}$/atm), "$\gamma_{Self}$" denotes a Lorentz broadening coefficient (Self) (cm$^{-1}$/atm), and "n" denotes a temperature dependence of the Lorentz width.

When a single pass cell or a multipass (multiple reflection) cell is used, the measurement procedure described with reference to FIG. 2 is applicable to, not only for the case of using WMS as the gas absorption spectroscopy, but also the case of using an optical resonator cell such as cavity ring-down absorption spectroscopy (CRDS).

Modifications

Figure 7:
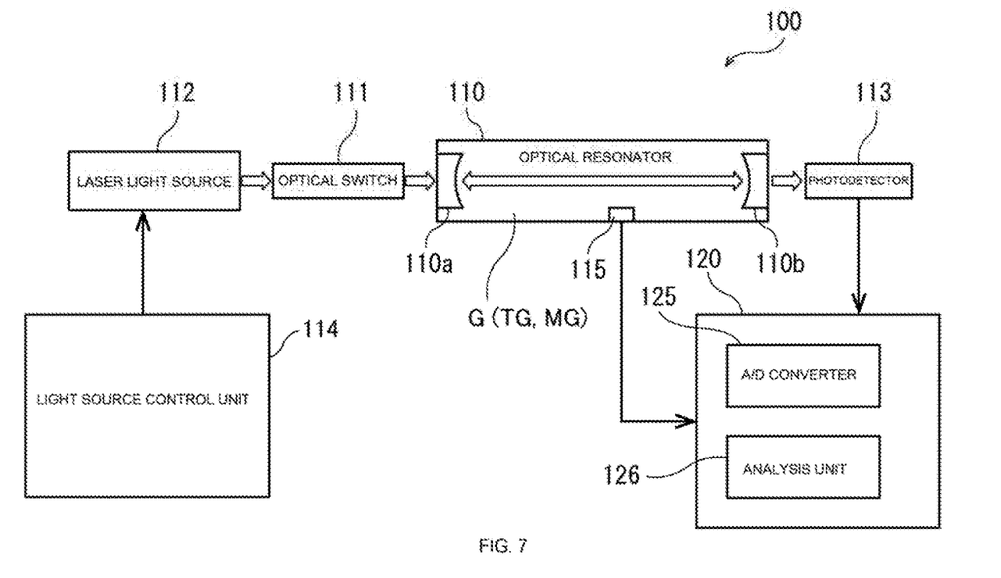
FIG. 7 is a diagram illustrating a modification of the gas absorption spectrometer according to the above embodiment of the present invention.

FIG. 7 is a diagram illustrating a modification of the gas absorption spectrometer in the present embodiment and illustrates a measurement system for the case of using CRDS as the gas absorption spectroscopy. A gas absorption spectrometer (cavity ring-down absorption spectrometer) 100 in the present modification includes: an optical resonator 110 to have a measurement object gas G introduced thereto, the measurement object gas G containing a measurement target gas TG and a mixed gas MG other than the measurement target gas TG; a laser light source 112 and an optical switch 111 disposed on one side across the optical resonator 110; a photodetector 113 disposed on the other side; a light source control unit 114 to control the laser light source 112; a pressure sensor 115 to detect a pressure of the measurement object gas G in the optical resonator 110; and a measurement unit 120 connected to the photodetector 113 and the pressure sensor 115 to quantify output of the photodetector 113 and the pressure sensor 115 for storage and to perform various calculations.

The optical resonator 110 is a Herriott cell that is disposed between the optical switch 111 and the photodetector 113 to resonate light from the laser light source 112. The optical resonator 110 is provided with two highly reflective mirrors 110a and 110b. The two mirrors 110a and 110b are disposed to face each other and configured to confine the light from the laser light source 112 incident on the optical resonator 110 between the two mirrors 110a and 110b to extend an effective optical path length. The optical resonator 110 in the present modification is also provided with a function as a gas cell to have the measurement object gas G introduced thereto, the measurement object gas G containing the measurement target gas TG and the mixed gas MG other than the measurement target gas TG. While the optical resonator 110 in the present modification is configured with the two mirrors 110a and 110b, a ring resonator configured with three or more mirrors may be used.

The optical switch 111 is a device that is disposed between the laser light source 112 and the optical resonator 110 to turn on/off (i.e., to transmit or block) the light from the laser light source 112.

The laser light source 112 is, similar to the laser light source 12 in the above embodiment, wavelength tunable in a range covering absorption wavelengths of at least the measurement target gas TG and the mixed gas MG.

The light source control unit 114 is a device that controls the laser light source 112 to sweep (change) the wavelength of the laser light source 112 between predetermined minimum and maximum wavelengths.

The photodetector 113 is a device that detects intensity of light emitted from the optical resonator 110, and the information (electrical signal) on the light intensity detected by the photodetector 113 is output to the measurement unit 120.

The pressure sensor 115 is a sensor that has a sensor surface, not shown, exposed in the optical resonator 110 to detect the pressure of the measurement object gas G. The information (electrical signal) on the pressure detected by the pressure sensor 115 is output to the measurement unit 120.

The measurement unit 120 has an A/D converter 125 and an analysis unit 126. The A/D converter 125 is a device that digitizes the information on the light intensity output from the photodetector 113 and the information on the pressure output from the pressure sensor 115 for storage in a storage device, not shown. The analysis unit 126 is a device that mathematically calculates data obtained by the A/D converter 125 (data in the storage device) to measure the temperature and the concentration of the measurement target gas TG.

As described above, the light emitted from the laser light source 112 is incident, through the optical switch 111, on the optical resonator 110 to have the measurement object gas G introduced thereto. When the frequency of the light incident on the optical resonator 110 coincides with the mode frequency of the optical resonator 110, optical power is stored in the optical resonator 110. When the light from the laser light source 112 is blocked by the optical switch 111 while the optical power is sufficiently stored in the optical resonator 110, the light stored in the optical resonator 110 reciprocates in the resonator 110 from thousands to tens of thousands of times during which the light is attenuated due to the absorption of the measurement object gas G in the optical resonator 110. Accordingly, by measuring the attenuation of the light leaked from the optical resonator 110 by the photodetector 113 to obtain a time constant (ring-down time) of the light attenuation, it is possible to obtain an absorption coefficient of the measurement object gas G at the frequency of light incident on the optical resonator 110 at that point (i.e., frequency of the light emitted from the laser light source 112). Then, the light source control unit 114 sweeps the frequency of the light of the laser light source 112, thereby obtaining the absorption spectrum of the measurement object gas G similar to the gas absorption spectrometer 1 in the above embodiment. The absorption coefficient $\alpha$ of the measurement object gas G is obtained by the following expression (7):

[Math 7]
$$\alpha = \frac{1}{c}\left(\frac{1}{\tau} - \frac{1}{\tau_0}\right). \quad (7)$$

In the expression (7), "c" denotes speed of light, "$\tau$" denotes a ring-down time while the measurement object gas G is in the optical resonator 110, and "$\tau_0$" denotes a ring-down time while the measurement object gas G is not in the optical resonator 110 or the absorption by the components in the measurement object gas G is negligible.

As just described, employment of CRDS as the gas absorption spectroscopy allows significant extension of the effective length of the light transmitting the measurement object gas G and it is thus possible to detect very slight absorption of the measurement object gas G.

What is claimed is:

1. A gas absorption spectrometer, comprising:
   a wavelength tunable light source;
   a light source control unit configured to change a wavelength of light emitted from the light source;
   a gas cell configured to have a measurement object gas introduced thereto, the measurement object gas containing a measurement target gas and a mixed gas other than the measurement target gas;
   a photodetector configured to detect intensity of light emitted from the light source and having passed through the gas cell;
   a gas concentration measurement unit configured to measure a concentration of the mixed gas; and
   a measurement unit configured to
   prepare an absorption spectrum of the measurement object gas from a change in the light intensity relative to the change in the wavelength by the light source control unit;
   measure at least one of a temperature and a concentration of the measurement target gas based on an absorption spectrum of the measurement target gas; and
   correct at least one of the measured temperature and the measured concentration of the measurement target gas based on the measured concentration of the mixed gas.

2. The gas absorption spectrometer according to claim 1, wherein
   the measurement unit is configured to:
   approximate the absorption spectrum by an approximate polynomial in a wavelength width range equivalent to a wavelength modulation width of WMS at each point of the wavelength; and
   prepare a second order differential spectrum of the absorption spectrum based on a factor in each term of the approximate polynomial at each point, and
   measure at least one of the temperature and the concentration of the measurement target gas based on the second order differential spectrum of the measurement target gas.

3. The gas absorption spectrometer according to claim 2, wherein the measurement unit includes the gas concentration measurement unit, and the gas concentration measurement unit measures the concentration of the mixed gas based on a second order differential spectrum of the mixed gas.

4. The gas absorption spectrometer according to claim 2, wherein the at least one of the temperature and the concentration of the measurement target gas is corrected using an approximate expression representing a change in peak height of the second order differential spectrum of the measurement target gas relative to the concentration of the mixed gas.

5. The gas absorption spectrometer according to claim 4, wherein the approximate expression is a power function.

6. The gas absorption spectrometer according to claim 4, wherein the measurement unit has a database configured to store the correction value therein.

7. The gas absorption spectrometer according to claim 2, wherein at least one of the temperature and the concentration of the measurement target gas is corrected using a correction value representing relationship between the concentration of the mixed gas and a peak height of the second order differential spectrum of the measurement target gas.

8. The gas absorption spectrometer according to claim 7, wherein the correction value is determined based on a change in Lorentz broadening coefficient (Air) relative to the concentration of the mixed gas.

9. The gas absorption spectrometer according to claim 2, wherein the measurement unit measures at least one of the temperature and the concentration of the measurement target gas using a peak height of the second order differential spectrum.

10. The gas absorption spectrometer according to claim 2, wherein the approximate polynomial is an approximate quadratic polynomial.

11. The gas absorption spectrometer according to claim 1, wherein the gas concentration measurement unit is disposed in the gas cell and has a concentration sensor configured to measure the concentration of the mixed gas.

12. The gas absorption spectrometer according to claim 1, further comprising a pressure sensor configured to detect a pressure of the measurement object gas, wherein the measurement unit corrects at least one of the temperature and the concentration of the measurement target gas based on the pressure of the measurement object gas and the concentration of the mixed gas.

13. The gas absorption spectrometer according to claim 1, wherein the gas absorption spectrometer is a cavity ring-down absorption spectrometer.

14. The gas absorption spectrometer according to claim 1, further comprising a display, wherein the corrected at least one of the measured temperature and the measured concentration of the measurement target gas is displayed by the display.

15. A gas absorption spectroscopy method, comprising:
irradiating a measurement object gas containing a measurement target gas and a mixed gas other than the measurement target gas with light with a tunable wavelength;
detecting intensity of light having passed through the measurement object gas;
preparing an absorption spectrum of the measurement object gas from a change in the light intensity relative to a change in the wavelength;
measuring at least one of a temperature and a concentration of the measurement target gas based on an absorption spectrum of the measurement target gas;
measuring a concentration of the mixed gas; and
correcting at least one of the temperature and the concentration of the measurement target gas based on the measured concentration of the mixed gas.

16. The gas absorption spectroscopy method according to claim 15, wherein
the measuring at least one of the temperature and the concentration of the measurement target gas includes:
approximating the absorption spectrum by an approximate polynomial in a wavelength width range equivalent to a wavelength modulation width of WMS at each point of the wavelength; and
preparing a second order differential spectrum of the absorption spectrum based on a factor in each term of the approximate polynomial at each point, and
at least one of the temperature and the concentration of the measurement target gas is measured based on the second order differential spectrum of the measurement target gas.

17. The gas absorption spectroscopy method according to claim 16, wherein the measuring the concentration of the mixed gas measures the concentration of the mixed gas based on a second order differential spectrum of the mixed gas.

18. The gas absorption spectroscopy method according to claim 16, wherein the correcting at least one of the temperature and the concentration of the measurement target gas includes:
obtaining a correction value from an approximate expression of a power function representing a change in peak height of the second order differential spectrum of the measurement target gas relative to the concentration of the mixed gas; and
correcting at least one of the temperature and the concentration of the measurement target gas measured by the measuring at least one of the temperature and the concentration of the measurement target gas using the correction value.

19. The gas absorption spectroscopy method according to claim 16, wherein the correcting at least one of the temperature and the concentration of the measurement target gas corrects at least one of the temperature and the concentration of the measurement target gas measured by the measuring at least one of the temperature and the concentration of the measurement target gas using a correction value determined based on a change in Lorentz broadening coefficient (Air) relative to the concentration of the mixed gas, the correction value representing relationship between the concentration of the mixed gas and a peak height of the second order differential spectrum of the measurement target gas.

20. The gas absorption spectroscopy method according to claim 15, further comprising detecting a pressure of the measurement object gas, wherein
the correcting at least one of the temperature and the concentration of the measurement target gas corrects at least one of the temperature and the concentration of the measurement target gas measured by the measuring at least one of the temperature and the concentration of the measurement target gas based on the pressure of the measurement object gas and the concentration of the mixed gas.

* * * * *